3,241,943
METHOD FOR THE PRODUCTION OF A FERTILIZER OR SOIL IMPROVEMENT AGENT FROM SULFITE WASTE LIQUOR WHILE RECOVERING ACIDS AND COMBUSTIBLE GASES FORMED IN THE PROCESS
Sven Gustav Bystrom, Ringvagen 16, Skoghall, Sweden
Filed Apr. 10, 1963, Ser. No. 272,113
Claims priority, application Sweden, Apr. 13, 1962, 4,173/62
5 Claims. (Cl. 71—9)

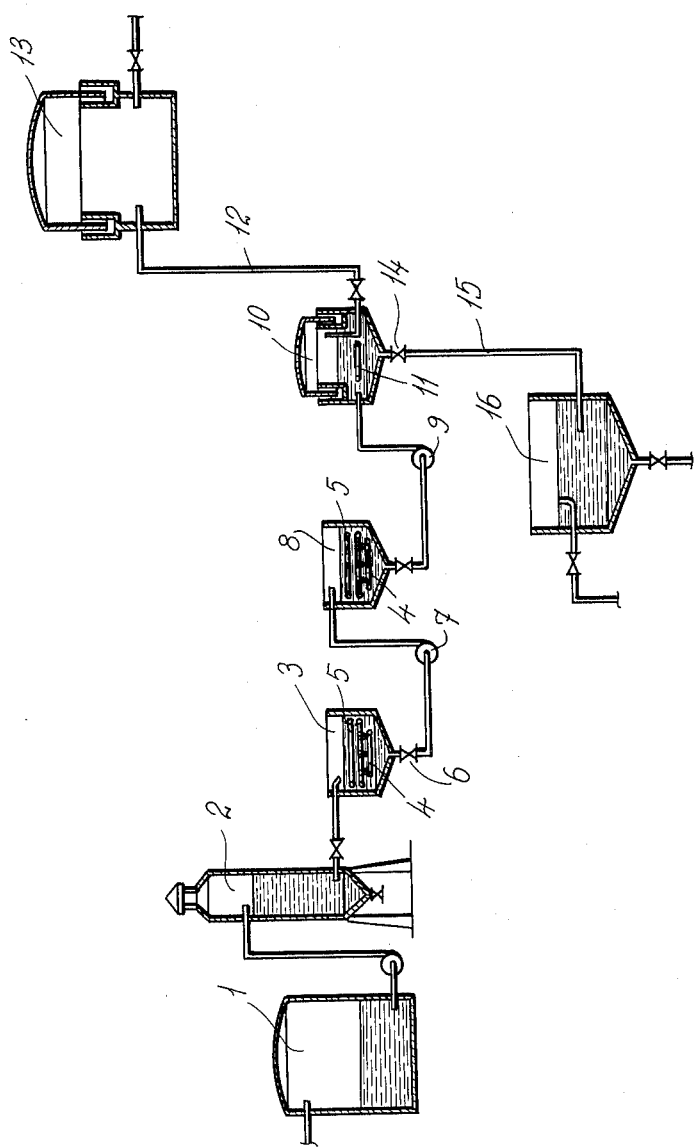

The present invention relates to a method of producing a fertilizer or soil improvement agent by fermentation from sulfite waste liquor while simultaneously recovering valuable fermentation products such as lower carboxylic acids, alcohols and combustible gases formed in the process.

In digesting cellulose in accordance with the sulfite process, more than 60% of the wood substance enters into solution, while only about 40% is recovered as cellulose. The sulfite waste liquor contains approximately 10–12% solids which consist principally of approximately 49–53% lignosulfonic acids, up to 20% fermentable sugars, 6–9% non-fermentable sugars, up to 15% aldonic acids, approximately 3% rosin, 3% acetic and formic acids, small amounts of other organic acids such as tannic acid, and various constituents not more closely defined.

Enormous quantities of sulfite waste liquor are discharged yearly into the water courses, which are contaminated by the acid waste liquor and accompanying fibers. This water contamination has already created great problems for the pulp mills, while at the same time great wealth is lost. A great deal of research over many successive years has been carried out on the economic utilization of the sulfite waste liquor but till now no really effective method has been forthcoming. Among earlier suggestions that have been applied, the fermentation in the pulp industry's spirit factories of the content of fermentable sugars (hexoses) in the waste liquor, and also in certain cases fermentation for the recovery of press-yeast, ought to be mentioned first. Sulfite waste liquor in concentrated form is also used as a fuel in the steam power plants of the pulp mills. Sulfite waste liquor is also used in small quantities as a dust binder on roads and as a raw material for producing tanning agents, vanillin, lignin resins and as a binder for briquettes etc. These, however, are matters involving only relatively very small quantities, and the problem of the contamination of the receiving waters still remains unsolved.

In the present invention it has now been shown that the content of organic matter of the sulfite waste liquor can be decomposed in an effective and economical manner while recovering a product usable as a fertilizer and soil improvement agent, at the same time that other valuable products can be recovered, such as acetic acid, butanol combustible gases (methane) and rosin acids. The waste water formed in the process is freed to a substantial degree from organic matter and moreover a neutral or alkaline pH is obtained, making possible the discharge of the waste water into the receiving waters without causing sanitary inconvenience or killing fish. Moreover it has been found that owing to its high content of microorganisms useful to the soil, the waste water can be used directly as a soil improvement agent.

The invention is based more particularly on a fractionated bacterial rotting or fermentation of the organic constituents of the sulfite waste liquor with a bacteria culture suited for the purpose, the fermentation being carried out in at least two steps, one of which is performed under aerobic and the other under anaerobic conditions. It has been shown that a rotted sludge obtained from a municipal sewage purification plant can be used to great advantage as a bacteria culture in the fermentation. The fermentation in the aerobic and the anaerobic steps is of a completely different character and the growth of certain species of bacteria is dominant in the aerobic step while other species dominate in the anaerobic step.

The process according to the invention is characterized by the steps of adjusting the sulfite waste liquor to alkaline reaction by the addition of alkalis, inoculating said liquor with a bacteria bearing putrefied sludge, under aeration subjecting the inoculated liquor thus obtained first to a submersed aerobic fermentation and then to an anaerobic fermentation while collecting gases developed in the course of the fermentations, separating the putrefied sludge formed in the fermentations from the liquor and treating said separated sludge with a mineral acid for removing acetic acid, and thereafter recovering it as a fertilizer and soil improvement agent.

The mineral acid added is preferably phosphoric and/or nitric acid, whereby the putrefied sludge is enriched with the phosphates and/or nitrates important as nutrients.

The prior condition for the successful performance of the fermentations is that the waste liquor is adjusted to a pH within the range of 7–10.5, preferably to a pH of approximately 9.

The alkalis added are, for example, carbonates, bicarbonates, oxides and hydroxides of alkali and earth alkali metals. Burnt and slaked lime and milk of lime have proved to be suitable as alkaline agents.

It has proved advantageous to introduce a putrefied sludge obtained from a municipal waste water purification plant as the bacteria culture in the fermentations. This bacteria culture must, however, be adapted to the specific composition of the sulfite waste liquor used as a nutrient medium, the pH of which on the other hand must be at an optimal value for the propagation of the bacteria. When a bacteria culture has been well cultivated, by means of which the sulfite waste liquor can be fermented in the desired manner, the waste liquor newly fed to the aerobic fermentation step can be inoculated with a sludge obtained at an earlier stage of the aerobic fermentation, while the liquor transmitted to the anaerobic fermentation step is inoculated with putrefied sludge obtained in the anaerobic fermentation.

A satisfactory anaerobic fermentation of the organic matter of the sulfite waste liquor is based on two different groups of bacteria which live in harmony with each other in the same anaerobic environment. One group, which normally occur in large numbers in sewage sludge and have great reproductive ability, are saprophytic microorganisms with the ability to decompose complex organic substances such as carbohydrates, fats and proteins and convert them to simple organic compounds. Of these, many are acid forming and decompose the organic material to low-molecular acids such as acetic and propionic acids. These acids, especially acetic acid, are formed in such great quantities at times that the anaerobic fermentation ceases because of the falling pH if at the same time care is not taken to provide for a sufficient excess of alkali, e.g. calcium carbonate, or that alkali is added progressively in order to bind the acid substances formed. The second group of microorganisms are the methane forming bacteria which vegetate on the low-molecular organic substances formed by the first named group of bacteria. The methane forming bacteria are sensitive to variations in the pH and can only increase within a relatively narrow pH-range of approximately 6.5–9. The methane forming bacteria cannot take charge of the acetic acid at the same rate that it is formed, but acetic acid (bound as calcium acetate) and methane are therefore always formed simultaneously in the anaerobic fermentation.

In the practical application of the process the fermentation is accomplished in the first step in an open fermentation basin with an aeration device until approximately 30% of the proportion of fermentable matter in the sulfite waste liquor has decomposed. After separating the undissolved constituents the liquor is introduced into a closed fermentation tower provided with a gas outlet for gases that are developed, where the content of fermentable organic matter in the liquor is decomposed by an anaerobic fermentation to approximately 50% in another step during the collection of a gas mixture containing approximately 70% methane and possibly other combustible gases such as hydrogen, and approximately 30% carbonic acid. The liquor obtained can be subjected to further aerobic and anaerobic fermentation or be recovered directly as a soil improvement agent or, if necessary, after treating it with a precipitation agent such as alum to separate non-fermentable organic constituents, be discharged into the water course.

In the fermentation process large quantities of acetic acid are formed which are bound as calcium acetate when the pH of the sulfite waste liquor is adjusted with calcium carbonate or calcium oxide. As a matter of fact, the acetic acid is formed in such great quantities that it has proved possible to recover acetic acid in an economical manner in the new process. For this purpose the fermented sludge is acidified with a dilute mineral acid, e.g. sulfuric, hydrochloric, phosphoric or nitric acid, preferably phosphoric and/or nitric acid as in this case the fermented sludge is enriched by the phosphates and/or nitrates valuable as growth nutrients. The acetic acid is driven off after that and recovered in a known manner.

The finished fermented liquor from which the solid salts are separated is then ready for use as a soil improvement agent.

The invention will be further explained in the following with reference to the attached drawing which shows an arrangement for carrying out the process according to the invention.

The acid liquor drawn off from the pulp digesters, or the waste liquor from the spirit plant, respectively, having a temperature of about 90° C., is pumped into a cistern 1 from where it is pumped to a neutralization tower 2 during agitation with e.g. compressed air and is mixed with lime to a pH of approximately 9–10. From the neutralization tower the liquor, at a temperature of about 60° C., is pumped into an open fermentation basin 3 provided with aeration and agitation devices, e.g. perforated coiled pipes 4, and with steam coils 5 for heating if necessary. At a temperature of about 35–60° C. the liquor is inoculated with a bacteria-containing putrefied liquor or sludge separated in a previous fermentation, if necessary complemented with fresh putrefied sludge from a municipal sewage purification plant. In the aerated fermentation basin 3 the first stage of the biolysis of the sulfite waste liquor is carried out to a bacteria content of approximately 80%.

After about 5–7 hours, when approximately 30% of the organic matter has been broken down, the partially decomposed liquor is discharged through an outlet valve 6 and by means of a pump 7, transmitted to a second aerated fermentation basin 8 wherein the aerobic fermentation is carried out in a second step.

The liquor fermented in the basin 8 is conveyed to a separating device (not shown) to separate the bacteria-containing sludge formed in the aerobic fermentation, said sludge being returned to the first aerated fermentation basin 3 to inoculate the fresh liquor charged to the fermentation basin 3, whereas the separated liquor is passed through a distillation plant (not shown) for the recovery of e.g. acetic acid and acetone. This step is not shown in the simplified drawing which illustrates only the controlled microbiological degradation process according to the invention.

Thereafter, the liquor is transmitted by means of a pump 9 to a closed fermentation tower 10, suitably constructed as a gas holder and provided with heating coils 11 and agitation means (not shown). In the fermentation tower 10 the liquor is inoculated with a fresh bacteria-containing putrefied sludge from a municipal sewage purification plant of the same type used in the aerobic fermentation steps, in which the bacteria, however, are easily adapted to the anaerobic conditions prevailing during this phase of the process. After the establishment of equilibrium conditions the bacteria of the anaerobic step can be separated and used to inoculate the liquor charged to the anaerobic fermentation tower 10. The organic matter of the liquor is then finally fermented under anaerobic conditions at a temperature of approximately 30–65° C. under the influence of the acetic acid and methane-forming bacteria present in the liquor which now greatly proliferate under optimal anaerobic conditions so that the bacteria content rises to 100%. The methane-containing gas mixture formed is passed through a pipe 12 to a gas holder 13. After the completed fermentation, which takes up to approximately 5 days, the fermented liquor is drawn off through a bottom outlet valve 14 and conveyed through a pipe 15 to a container 16.

The arrangement described above for carrying out the process constitutes only one example of how its practical application can be carried out. The drawing only illustrates the principle of the controlled microbiological decomposition of the organic matter of the sulfite liquor and more especially the lignin. This previously was not possible and must be considered an essential technical advance. To separate the non-fermentable solids of the waste liquor and the insoluble constituents formed in the course of the process, such as calcium carbonate and acetate, any known separating device can be used e.g. hydrocyclones, continuously operating centrifuges or vacuum filters. The fermentation tower has been described as a gas holder but a completely closed tower can also be used. Additional aerobic and anaerobic fermentation stages may be connected in series to the last, i.e. the anaerobic, fermentation stage. The gas pipes are of course provided with the necessary safety devices such as safety valves, flame guards etc.

It has been pointed out earlier that the fermentation process ought to be alkaline. The rosin acids ascending to the surface of the liquid in the fermentation basins during aeration are therefore bound as calcium and sodium soaps. The sticky rosin scum is recovered and from it calcium soap can be extracted in known manner or the free rosin acids extracted by acid treatment.

With the process proposed according to the invention for the microbiological fermentation of the organic matter contained in the sulfite waste liquor the following products can thus be obtained:

(1) A soil improvement agent which is also suitable as fertilizer, especially if the pH of the sulfite waste liquor is adjusted by the addition of lime and the acetic acid is deliberated from the putrefied sludge obtained from the fermentation tower by treatment with phosphoric and/or nitric acid, whereby the product is enriched with the elements calcium, nitrogen and phosphorus which are valuable as nutriments. If, moreover, the pH tends to fall below 7 because of the activity of the acetic acid forming bacteria, it can be adjusted by the addition of $NH_3$ in the fermentation tower, which further improves the utility of the product as a fertilizer.

(2) The gas collected from the closed fermentation tower contains approximately 70% methane and 30% carbon dioxide and small quantities of other gases, e.g. ammonia, hydrogen sulphide and other volatile sulphur compounds and can be used as an effective additional fuel in the steam power plant of the mill or, if necessary after washing and carbon dioxide and sulphur purification, as a fuel for internal combustion engines.

(3) Finished fermented sulfite waste liquor can be used after dewatering as a fuel in the steam power plant of the mill.

(4) Waste liquor obtained from the fermentation process is an excellent soil improvement agent.

Through the presence of putrefying bacteria, the waste water from the fermentation process can be discharged into existing drainage systems with conventional sewage treatment devices. After chlorinating and adjusting the pH at a value below 7, this water can be discharged into the water courses without risk of contamination.

Having now described the invention, what I claim as new and desire to secure by Letters Patent, is:

1. A method for the production of a fertilizer and soil improvement agent from sulfite waste liquor by fermentation while recovering acids and combustible gases formed in the process, said method comprising adjusting the temperature of the sulfite waste liquor to a value of up to 60° C., adjusting the pH of said liquor to a value within the range of 7 to 10.5 by adding thereto an alkaline agent selected from the group consisting of ammonia, and carbonates, bicarbonates, oxides and hydroxides of alkali and alkaline earth metals, inoculating said liquor with a bacteria containing putrefied sludge from a sewage purification process, subjecting the inoculated liquor to an aerobic fermentation under aeration for a period of about 5 to 7 hours and then to an anaerobic fermentation for a period of up to 5 days while maintaining the pH of the liquor within the aforementioned range by adding said alkaline agent thereto when the pH tends to fall due to microbiological formation of acetic acid, and recovering the fermented bacteria containing liquor.

2. A method for the production of a fertilizer and soil improvement agent from sulfite waste liquor by fermentation, said method comprising adjusting the temperature of the sulfite waste liquor to a value within the range of 35 to 60° C., adding lime in an amount sufficient to adjust the pH of said liquor to a value within the range of 7 to 10.5, inoculating said liquor with a bacteria containing putrefied sludge from a sewage purification process, subjecting the inoculated liquor to an aerobic fermentation stage under aeration for a period of about 5 to 7 hours and then to an anaerobic fermentation stage for a period of up to 5 days, adjusting the pH of the liquor to about 9 subsequent to said anaerobic fermentation by adding to the liquor an aqueous solution of ammonia, and recovering the bacteria containing liquor as a fertilizer and soil improvement agent.

3. The method according to claim 2, in which the waste liquor newly supplied to the aerobic fermentation stage is inoculated with a bacteria containing sludge obtained from an earlier aerobic fermentation, while the liquor transmitted to the anaerobic fermentation stage is inoculated with a fermented sludge obtained from an earlier anaerobic fermentation.

4. The method according to claim 2, in which the aerobic fermentation is first accomplished with aeration until approximately 30% of the sulfite waste liquors content of putrescible organic matter has been broken down, recovering rosin acids which are converted into calcium soaps while the remaining partially fermented liquor is subjected to anaerobic fermentation to break down the putrescible organic matter to approximately 50% while a gas mixture containing approximately 70% methane and 30% carbonic acid is collected, and recovering the putrefied bacteria containing sludge formed.

5. A method for the production of a fertilizer and soil improvement agent from sulfite waste liquor by fermentation, said method comprising adjusting the temperature of the sulfite waste liquor to a value within the range of 35 to 60° C., adding sodium hydroxide to the liquor in an amount sufficient to adjust the pH of said liquor to a value within the range of 7 to 10.5, inoculating said liquor with a bacteria containing putrefied sludge from a sewage purification process, subjecting the inoculated liquor to an anaerobic fermentation for a period of up to 5 days while mantaining the pH of the liquor within said range by adding ammonia thereto when the pH tends to fall due to microbiological formation of organic acids, and recovering the fermented bacteria containing liquor.

References Cited by the Examiner

UNITED STATES PATENTS

| | | | |
|---|---|---|---|
| 1,550,537 | 8/1925 | Gorbing | 71—25 |
| 1,710,272 | 4/1929 | Richter | 71—25 |
| 1,976,905 | 10/1934 | Thordarson | 71—25 |
| 2,663,628 | 12/1953 | Thomsen | 71—25 |
| 2,774,754 | 12/1956 | Schnell | 71—25 |
| 2,867,521 | 1/1959 | Jeffreys | 71—25 |

DONALL H. SYLVESTER, *Primary Examiner.*

ANTHONY SCIAMANNA, *Examiner.*

T. D. KILEY, *Assistant Examiner.*